April 28, 1936. C. W. FROEHLICH 2,038,652
GRADING MACHINE
Filed March 25, 1935
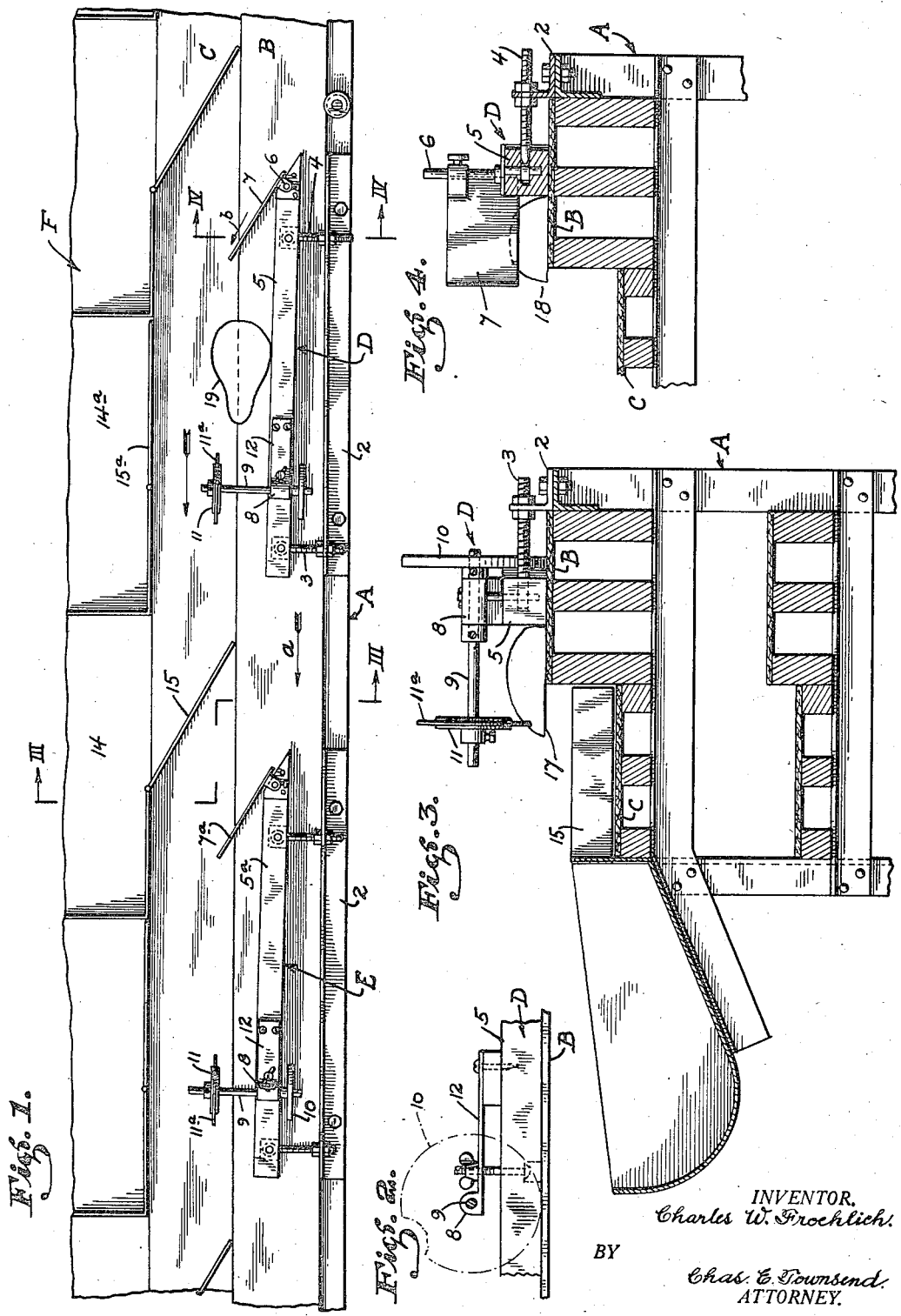
INVENTOR.
Charles W. Froehlich.
BY
Chas. E. Townsend.
ATTORNEY.

Patented Apr. 28, 1936

2,038,652

UNITED STATES PATENT OFFICE 2,038,652

GRADING MACHINE

Charles W. Froehlich, Hayward, Calif.

Application March 25, 1935, Serial No. 12,838

3 Claims. (Cl. 209—90)

This invention relates to a grading machine, and particularly to a machine whereby fruits, vegetables, and other objects, which vary in width and thickness, may be separated and graded.

It is common practice to grade fruit, such as oranges, apples, pears, and certain vegetables, into varying sizes by passing them between a pair of gradually separating belts, between tapering rollers, etc., but such grading devices or machines can only handle whole fruit, etc.

In canneries where fruit such as pears, peaches, etc., are handled the fruit as received may be graded but after peeling, halving, etc., preparatory to being placed in the cans and cooked, the sizes of the halved fruit may vary considerably both in width and thickness.

The object of the present invention is to generally improve and simplify the construction and operation of grading machines, and particularly to provide a machine whereby halved fruits, and other objects, may be separated into two or more sizes in accordance with width and thickness. The invention, more specifically stated, embodies a conveyor belt upon which the halved fruit or other objects to be graded are delivered to a continuously trailing belt, and grading means cooperating with the belt and positioned at spaced intervals along the length of the same for removing the fruit from the belt and laterally thereof in accordance with width and thickness.

The grading machine is shown by way of illustration in the accompanying drawing, in which—

Fig. 1 is a plan view of the grading machine.

Fig. 2 is a detail side elevation of the adjustable bearing supporting the wheel 11.

Fig. 3 is an enlarged vertical cross section taken on line III—III of Fig. 1.

Fig. 4 is an enlarged vertical cross section taken on line IV—IV of Fig. 1.

Referring to the drawing in detail, and particularly Figs. 1 and 2, A indicates a frame of suitable length, and B and C a pair of parallel continuously traveling conveyor belts extending lengthwise of the frame.

The halved fruit, or other objects to be graded, is delivered to one end of the belt B and is carried thereby to the grading devices, generally indicated at D and E. The belt C receives the fruit removed from belt B by the graders D and E, and in turn delivers the graded fruit to a series of bins F disposed at the side of the belt.

The graders shown are identical and are constructed as follows. Suitably secured to the frame parallel to the belt B is a piece of angle iron 2, and extending through the angle iron and adjustably secured thereto are a pair of rods 3 and 4 on the outer ends of which is secured a bar 5. This bar is disposed directly above the belt and extends longitudinally thereof but at a slight angle with relation to the longitudinal axis of the belt; the angle being changeable by the adjustable connection between the rods 3 and 4 and the angle iron 2.

The bar 5 may be in direct contact with the belt but a slight clearance is preferably maintained to eliminate unnecessary wear on the belt. This, however, is of no particular importance as the main function of the bar is that of deflecting and grading objects in accordance to width as will hereinafter be described. Suitably secured at one end of the bar 5 is a vertically disposed post 6 and supported by the post is a plate 7. This plate is vertically adjustable with relation to belt B and its function is that of deflecting and grading objects in accordance with thickness as will hereinafter be described. Also, supported by bar 5 is a bearing 8 in which is journaled a shaft 9 and secured therein is a wheel 10, which is frictionally driven by contact with belt B. The opposite end of the shaft carries a wheel 11 provided with a flexible annular perforated flange 11a constructed of soft rubber, or the like, which functions to assist in removing from belt B objects to be graded. The bearing 8 is supported by a spring arm 12 and an adjusting screw extends through the same so that any desired frictional contact may be maintained between wheel 10 and belt B so as to insure continuous rotation of the rubber flanged wheel. In order that the operation of the grader will be clearly understood let it be assumed that halved pears, or similar fruit, is being handled. If that is the case the halved pears will be placed with the flat surface down at the receiving end of belt B, and as the belt travels in the direction of arrow $a$ the pears will first pass beneath the plate 7 where all pears too thick to pass will engage the plate and will be deflected thereby in the direction of arrow $b$, and as such will be discharged onto belt C and delivered to the bin or hopper indicated at 14 by the deflector gate 15. The pears which pass the plate 7 will next engage the bar 5 and they will be deflected toward the edge of the belt B and if they are wide enough they will topple over and fall onto belt C and will be delivered to bin 14 by gate 15. The pears which pass both plate 7 and bar 5 will continue on and will next be acted upon by the grader E; that is, plate 7a and bar 5a. Thus, pears of a certain thickness and width will be removed by the grader D. Pears having less thickness and width will be removed by the grader E, and so on.

Where the pears are being graded in accordance with width by the bars 5 and 5a, there will be pears that will be deflected to the edge of belt B and assume a position where they are just on the verge of falling off and as such might be carried on to the next grader. To prevent this the rubber flanged wheels are provided. They are continuously rotated and when a pear assumes the position just described the rubber flange of the wheel will engage the outer edge of the pear and tilt it sufficiently to cause it to fall off, this operation being clearly illustrated at 17 in Fig. 3. Grading in accordance with thickness is shown at 18 in Fig. 4, and grading in accordance with width is shown at 19 in Fig. 1.

The grader here illustrated has been described in conjunction with the grading of halved fruits, such as pears, peaches, etc., but it should be understood that it may be used for other purposes. For instance, the grading of cans of varying height and diameter, the grading of cartons of varying height and width, and so on. For instance, if cartons are to be graded which vary in height and width, they will be placed on the receiving end of the belt in the same manner as the fruit. All the high cartons will be deflected by the plate 7, while the cartons of less height but of greater width will be deflected and removed from the belt by the bar 5, and so on. In that case the cartons deflected by the plate 7 may be transferred to the bin, indicated at 14a, by a gate 15a, and the cartons of less height and greater width deflected by the bar 5 will be deposited in the bin 14 by the gate 15.

While other features of the invention have been more or less specifically described and illustrated, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is:

1. A grading machine comprising a continuous traveling conveyor belt to receive and carry objects to be graded, an elongated bar disposed above the belt in substantial contact therewith, said bar being disposed longitudinally of the belt but on a slight angle with relation to the line of travel of the belt, said bar being engageable with and laterally deflecting objects of varying width to remove them from one edge of the belt, a plate carried by one end of the bar and disposed on an angle with relation to the line of travel of the belt, and means for vertically adjusting the height of the plate with relation to the surface of the belt to permit objects of varying thickness to pass under the plate and other objects of greater thickness to be engaged by the plate and deflected laterally off one edge of the belt.

2. A grading machine comprising a continuous traveling conveyor belt to receive and carry objects to be graded, an elongated bar disposed above the belt in substantial contact therewith, said bar being disposed longitudinally of the belt but on a slight angle with relation to the line of travel of the belt, said bar being engageable with and laterally deflecting objects of varying width to remove them from one edge of the belt, a plate carried by one end of the bar and disposed on an angle with relation to the line of travel of the belt, means for vertically adjusting the height of the plate with relation to the surface of the belt to permit objects of varying thickness to pass under the belt and other objects of greater thickness to be engaged by the plate and deflected laterally off one edge of the belt, a second belt running parallel to the first named belt and on a plane below the same, and means for removing objects delivered thereto by lateral deflection from the deflector bar, and for directing the objects into separate bins.

3. A grading machine comprising a continuous traveling conveyor belt to receive and carry objects to be graded, an elongated bar disposed above the belt in substantial contact therewith, said bar being disposed longitudinally of the belt but on a slight angle with relation to the line of travel of the belt, said bar being engageable with and laterally deflecting objects of varying width to remove them from one edge of the belt, means for adjusting the angle of the deflecting bar, a spring arm secured at one end above the conveyor belt, a shaft journaled on the free end of said arm and projecting crosswise of the conveyor belt, a disc secured on the shaft parallel to the conveyor belt but spaced from one edge thereof, a second disc secured to the shaft and engageable with the conveyor belt, said second disc having frictional engagement with the belt to be driven thereby, and adjustable means engageable with the spring arm to increase or decrease the frictional engagement between the second-named disc and the conveyor belt.

CHARLES W. FROEHLICH.